US011150928B2

United States Patent
Tsirkin et al.

(10) Patent No.: US 11,150,928 B2
(45) Date of Patent: Oct. 19, 2021

(54) HYPERVISOR TRANSLATION BYPASS

(71) Applicant: Red Hat Israel, Ltd., Ra'anana (IL)

(72) Inventors: Michael Tsirkin, Yokneam Illit (IL); Igor Mammedov, Brno (CZ)

(73) Assignee: RED HAT ISRAEL, LTD., Ra'Anana (IL)

( * ) Notice: Subject to any disclaimer, the term of this patent is extended or adjusted under 35 U.S.C. 154(b) by 159 days.

(21) Appl. No.: 15/223,695

(22) Filed: Jul. 29, 2016

(65) Prior Publication Data

US 2017/0357579 A1    Dec. 14, 2017

Related U.S. Application Data

(60) Provisional application No. 62/347,367, filed on Jun. 8, 2016.

(51) Int. Cl.
*G06F 12/08* (2016.01)
*G06F 9/455* (2018.01)
*G06F 12/1009* (2016.01)
*G06F 12/109* (2016.01)

(52) U.S. Cl.
CPC ...... *G06F 9/45558* (2013.01); *G06F 12/1009* (2013.01); *G06F 12/109* (2013.01); *G06F 2009/45583* (2013.01); *G06F 2212/1024* (2013.01); *G06F 2212/151* (2013.01); *G06F 2212/152* (2013.01); *G06F 2212/656* (2013.01); *G06F 2212/657* (2013.01)

(58) Field of Classification Search
CPC ............. G06F 12/0284; G06F 12/1009; G06F 9/45558
See application file for complete search history.

(56) References Cited

U.S. PATENT DOCUMENTS

| | | | | |
|---|---|---|---|---|
| 4,730,249 A | * | 3/1988 | O'Quin, II | G06F 12/1009 711/E12.059 |
| 4,792,895 A | * | 12/1988 | Tallman | G06F 12/0284 711/E12.013 |
| 5,390,309 A | | 2/1995 | Onodera | |
| 5,426,748 A | * | 6/1995 | Brenza | G06F 12/0292 711/2 |
| 6,226,730 B1 | * | 5/2001 | Murdoch | G06F 12/0215 711/200 |
| 7,716,446 B1 | * | 5/2010 | Chen | G06F 9/5016 711/170 |
| 8,015,388 B1 | | 9/2011 | Rihan et al. | |

(Continued)

OTHER PUBLICATIONS

Andrew Ayer, "KVMSandbox: Application-Level Sandboxing with x86 Hardware Virtualization and KVM" (Year: 2012).*

(Continued)

*Primary Examiner* — Ryan Bertram
*Assistant Examiner* — Trang K Ta
(74) *Attorney, Agent, or Firm* — K&L Gates LLP

(57) ABSTRACT

A system and method of translation bypass includes a hypervisor reserving a range of host virtual addresses. The hypervisor detects that a guest address is unmapped. The hypervisor determines a host virtual address. Determining the host virtual address includes adding the guest address to a host virtual address base offset. The host virtual address is within the range of host virtual addresses. The hypervisor maps the guest address to the host virtual address.

20 Claims, 6 Drawing Sheets

(56) References Cited

U.S. PATENT DOCUMENTS

| | | | | |
|---|---|---|---|---|
| 8,127,098 | B1* | 2/2012 | Klaiber | G06F 9/45533 |
| | | | | 711/151 |
| 8,688,953 | B2 | 4/2014 | Franke et al. | |
| 8,694,712 | B2 | 4/2014 | Sheu et al. | |
| 8,843,669 | B2 | 9/2014 | Pavlov | |
| 9,208,103 | B2 | 12/2015 | Kessler et al. | |
| 2008/0005447 | A1* | 1/2008 | Schoenberg | G06F 12/109 |
| | | | | 711/6 |
| 2009/0216992 | A1* | 8/2009 | Greiner | G06F 12/1009 |
| | | | | 711/206 |
| 2014/0068137 | A1* | 3/2014 | Kegel | G06F 12/1009 |
| | | | | 711/6 |
| 2014/0101404 | A1* | 4/2014 | Bybell | G06F 12/1027 |
| | | | | 711/206 |
| 2014/0298334 | A1 | 10/2014 | Munetoh | |
| 2015/0324297 | A1* | 11/2015 | Tati | G06F 9/45558 |
| | | | | 711/6 |
| 2017/0097840 | A1* | 4/2017 | Bridgers | G06F 15/17 |
| 2017/0116419 | A1* | 4/2017 | Woodward | G06F 12/10 |

OTHER PUBLICATIONS

Pfefferle et al. ("A Hybrid I/O Virtualization Framework for RDMA-capable Network Interfaces", Mar. 2015) (Year: 2015).*

Do VMMs use Virtual Memory on the Hosts?; http://stackoverflow.com/questions/14709738/do-vmms-use-virtual-memory-on-the-hosts.

The x86 kvm Shadow MMU; https://www.kernel.org/doc/Documentation/virtual/kvm/mmu.txt.

* cited by examiner

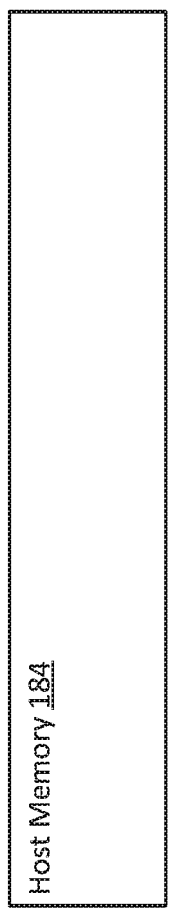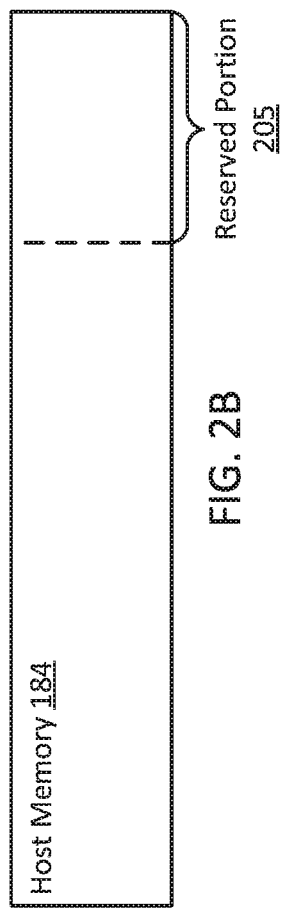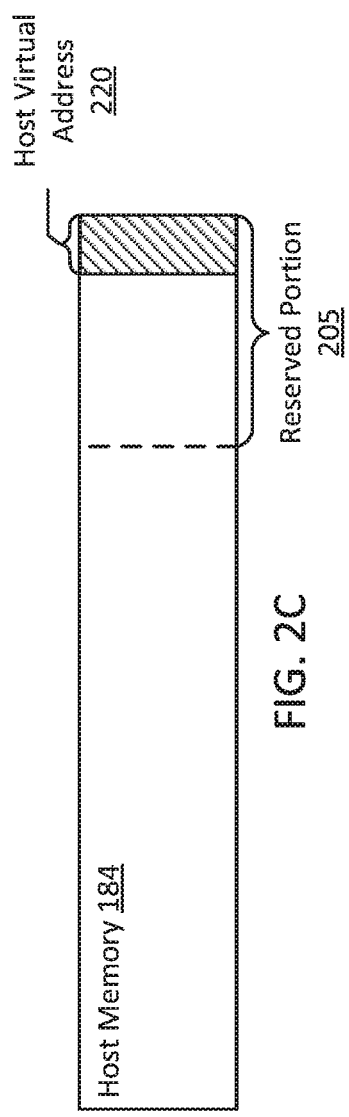

HYPERVISOR TRANSLATION BYPASS

CROSS-REFERENCE TO RELATED APPLICATION

The present application claims priority to and the benefit of U.S. Provisional Application No. 62/347,367, filed Jun. 8, 2016, the entire contents of which are incorporated by reference herein.

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative methods and systems for hypervisor translation bypass. An example method includes reserving, by a hypervisor, a range of host virtual addresses. The hypervisor detects that a guest address is unmapped and determines a host virtual address. Determining the host virtual address includes adding the guest address to a host virtual address base offset, where the host virtual address is within the range of host virtual addresses. The hypervisor maps the guest address to the host virtual address.

Additional features and advantages of the disclosed methods and system are described in, and will be apparent from, the following Detailed Description and the Figures.

BRIEF DESCRIPTION OF THE FIGURES

FIGS. 2A-C are block diagrams illustrating an example of reserving a portion of memory according to an example of the present disclosure.

DETAILED DESCRIPTION OF EXAMPLE EMBODIMENTS

In computer systems executing a guest virtual machine, a hypervisor may typically receive a request from the guest virtual machine through a virtual device. This request is then executed on behalf of the guest virtual machine. For example, a request to transmit or receive packets of information is executed on behalf of the guest virtual machine. Typically, requests are in guest memory and are passed by the guest virtual machine using a guest address (e.g., guest physical address, guest bus address), which is typically stored in a device request buffer of the virtual device in guest memory.

To execute the request on behalf of the guest virtual machine, the hypervisor typically translates a guest physical address to a host virtual address, and then accesses the request through the host virtual address. Similarly, when using a virtual input-output memory management unit, the hypervisor typically translates a guest bus address to a host address and then accesses the request through the host address. However, the above discussed translation adds significant overhead, especially for applications involving network function virtualization, which may deal with a large amount of access requests involving a small amount of processing resources for each access request. For example, a great deal of requests to transmit and/or receive packets of information may be received, where each request provides minimal information; so, reducing overhead caused by guest address translation may provide a significant advantage.

By reserving a range of host virtual addresses and mapping guest addresses to host virtual addresses, the system may be configured for hypervisor translation bypass. For example, instead of the hypervisor translating a guest address to a host virtual address, the hypervisor adds a host virtual address offset to the guest address to bypass the translation. By bypassing translation, the hypervisor has additional processing resources to execute more requests on behalf of guest virtual machines. Additionally, because bypassing translation provides for increased computing performance, for example, the hypervisor has additional processing resources to allow more guest virtual machines to execute on a given host without negatively affecting performance. The present disclosure describes advantageous systems and methods for hypervisor translation bypass to reduce overhead and increase efficiency of network function virtualization applications.

Figure 1:
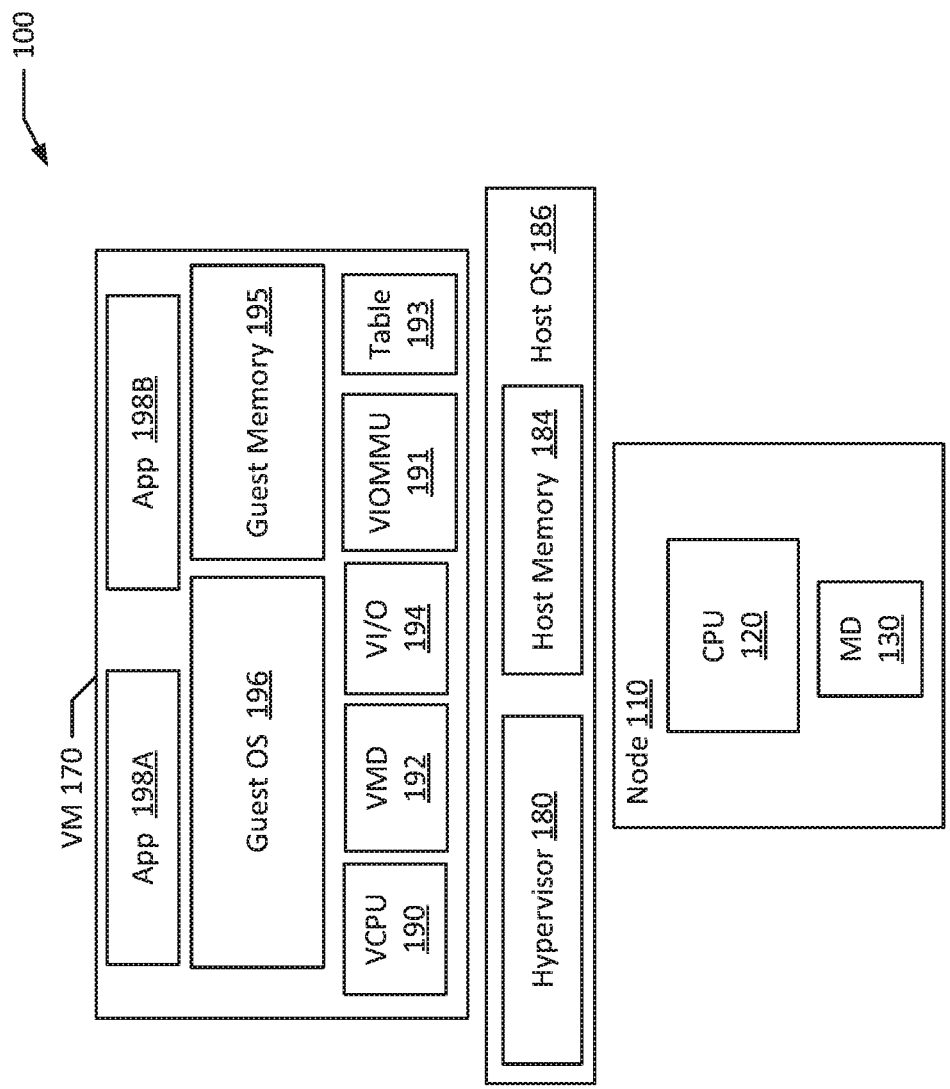
FIG. 1 is a block diagram of an example multi-processor computer system according to an example of the present disclosure.

FIG. 1 depicts a high-level component diagram of an example multi-processor computer system 100 in accordance with one or more aspects of the present disclosure. The computer system 100 may include one or more interconnected nodes 110. Each node 110 may in turn include one or more physical processors (e.g., CPU 120) communicatively coupled to memory devices (e.g., MD 130). In an example, the one or more physical processors (e.g., CPU 120) may be communicatively coupled to other input/output devices. Likewise, in an example, nodes may include a hardware device. In an example, a hardware device may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor (e.g., CPU 120) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130 refers to a volatile or non-volatile memory device, such as RAM, ROM, EEPROM, or any other device capable of storing data. As discussed herein, input/output device refers to a device capable of providing an interface between one or more processors and an external device. The external device's operation is based on the processor inputting and/or outputting data.

Processor 120 may be interconnected to additional processors using a variety of techniques, ranging from a point-to-point processor interconnect, to a system area network, such as an Ethernet-based network. Local connections within each node 110, including the connections between a processor 120 and a memory device 130, between a processor 120 and an input/output device, etc., may be provided by one or more local buses of suitable architecture, for example, peripheral component interconnect (PCI). As used herein, a device of the host operating system (host OS) 186 (or host device) may refer to CPU 120, MD 130, input/output, a software device, and/or hardware device.

Computer system 100 may run at least one guest virtual machine (e.g., VM 170), by executing a software layer (e.g., hypervisor 180) above the hardware and below the guest virtual machine 170, as schematically shown in FIG. 1. In an example, the hypervisor 180 may be a component of the host operating system 186 executed by the computer system 100. In another example, the hypervisor 180 may be provided by an application running on the host operating system 186. In another example, the hypervisor 180 may run directly on the computer system 100 without an operating system beneath it. For example, the hypervisor 180 may run directly on computer system 100, without host operating system 186 or host memory 184. The hypervisor 180 may virtualize the physical layer, including processors, memory, and input/output devices, and present this virtualization to the guest virtual machine 170 as devices, including a virtual processor (e.g., VCPU 190), virtual memory device (e.g., VMD 192), and/or virtual I/O device (e.g., VI/O 194, also referred generally to as a virtual device 194). The hypervisor 180 may additionally virtualize a virtual input-output memory management unit 191 and a guest page table 193.

A guest virtual machine 170 may run on any type of dependent, independent, compatible, and/or incompatible applications on the underlying hardware and OS 186. In an example, applications (e.g., App 198A-B) run on a guest virtual machine 170 may be dependent on the underlying hardware and/or OS 186. In another example, applications 198A-B run on guest virtual machine 170 may be independent of the underlying hardware and/or OS 186. For example, applications 198A-B run on guest virtual machine 170 may be dependent on the underlying hardware and/or OS 186 while other applications run on a second guest virtual machine are independent of the underlying hardware and/or OS 186. Additionally, applications 198A-B run on the guest virtual machine 170 may be compatible with the underlying hardware and/or OS 186. In an example, applications 198A-B run on the guest virtual machine 170 may be incompatible with the underlying hardware and/or OS 186. For example, applications 198A-B run on the guest virtual machine 170 may be compatible with the underlying hardware and/or OS 186 while other applications run on a second guest virtual machine are incompatible with the underlying hardware and/or OS 186. In an example, a device may be implemented as a guest virtual machine 170.

In an example, a guest virtual machine 170 may execute a guest operating system (guest OS) 196, which may utilize the underlying VCPU 190, VMD 192, and VI/O device 194. One or more applications 198A-B may be running on a guest virtual machine 170 under the guest operating system 196. In an example, a guest virtual machine 170 may include multiple virtual processors. Processor virtualization may be implemented by the hypervisor 180 scheduling time slots on one or more physical processors 120 such that, from the guest operating system's perspective, those time slots are scheduled on a virtual processor 190.

The hypervisor 180 controls and limits access to memory (e.g., memory allocated to the guest virtual machine 170 and memory allocated to the guest operating systems 196, such as guest memory 195 provided to guest operating systems 196, etc.). For example, guest memory 195 may be divided into a plurality of memory pages. Access to these memory pages is controlled and limited by the hypervisor 180. For example, mappings to memory are managed by the hypervisor 180. Through these mappings, the memory itself can be accessed. Likewise, mappings may be used together with any paging data structure used by the guest virtual machine 170 to support translation from guest OS 196 to host OS 186 addresses (e.g., 32-bit linear address space using a two-level hierarchical paging structure, Physical Address Extension mode, INTEL® Extended Memory 64 Technology mode, etc.). Likewise, for example, guest memory 195 allocated to the guest operating system 196 is mapped from host memory 184 such that when a guest application 198A-B or a device (e.g., a virtual device 194, a hardware device, etc.) uses or accesses a memory page of guest memory 195 it is actually using or accessing host memory 184. Host memory 184 may also be referred to as host physical memory 184, as host physical memory 184 may physically exist on physical hardware of a computer system (e.g., system 100).

FIGS. 2A-C are block diagrams illustrating an example of reserving a portion of memory according to an example of the present disclosure. FIG. 2A illustrates a first memory configuration 201. In the first memory configuration 201, a portion of host memory 184 has not yet been reserved for hypervisor translation bypass. For example, the hypervisor 180 has not yet selected a range of host virtual addresses (e.g., the reserved portion 205). FIG. 2B illustrates a second memory configuration 202. In the second memory configuration 202, a reserved portion 205 of host memory 184 has been reserved. For example, the hypervisor 180 has selected a range of host virtual addresses (e.g., the reserved portion 205) for hypervisor translation bypass. FIG. 2C illustrates a third memory configuration 203. In the third memory configuration 203, a host virtual address 220 in the reserved portion 205 of host memory 184 is mapped to a guest address. For example, the host virtual address 220 is mapped to a guest address in a one-to-one relationship (e.g., one host virtual address 220 for one guest address). In various examples, the guest address may be a guest physical address and/or a guest bus address. Likewise, a guest address may be referred to as a guest address handle. The host virtual address 220 is described in greater detail below with respect to FIGS. 3 to 4B.

Figure 3:
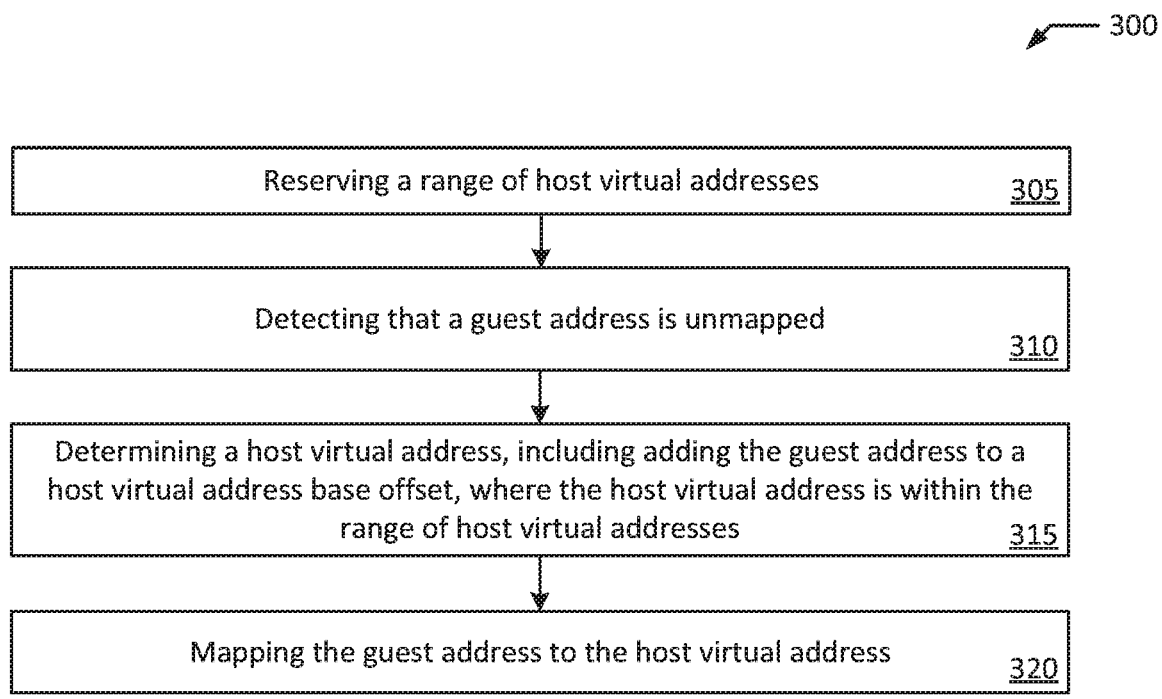
FIG. 3 is a flowchart illustrating an example method of translation bypass according to an example of the present disclosure.

FIG. 3 is a flowchart illustrating an example method of translation bypass according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described may be optional. The method 300 may be performed by processing logic that may include hardware (circuitry, dedicated logic, etc.), software, or a combination of both. For example, the method 300 may be performed by a hypervisor 180 interacting with guest virtual machine 170 and a virtual device 194.

The example method 300 starts with reserving a range of host virtual addresses (block 305). For example, a hypervisor 180 selects a reserved portion 205 of host memory 184. The example method 300 further includes detecting that a guest address is unmapped (block 310). In various examples, the guest address may be a guest physical address and/or a guest bus address. For example, the guest address may be a guest physical address in guest memory 195. In an example, detecting that a guest address is unmapped may include verifying, by the hypervisor, that the guest address is not within the range of host virtual addresses (e.g., the reserved portion 205)

The example method 300 further includes determining a host virtual address (block 315). Determining the host virtual address includes adding the guest address to a host virtual address base offset, where the host virtual address is within the range of host virtual addresses. For example, determining a host virtual address 220 includes adding a host virtual address base offset (e.g., a 2 GB offset) to the guest physical address in guest memory 195. In an example, the resulting host virtual address 220 is within the range of host virtual addresses (e.g., the reserved portion 205). Alternatively, for example, if the host virtual address 220 is not within the range of host virtual addresses (e.g., the reserved portion 205), a page fault may be detected. Page fault detection is described in greater detail below with reference to FIG. 4A-B.

The example method 300 further includes mapping the guest address to the host virtual address (block 320). For example, when the determined host virtual address 220 is within the reserved portion 205, the hypervisor 180 maps the guest physical address in guest memory 195 to the host virtual address 220.

Figure 4A:
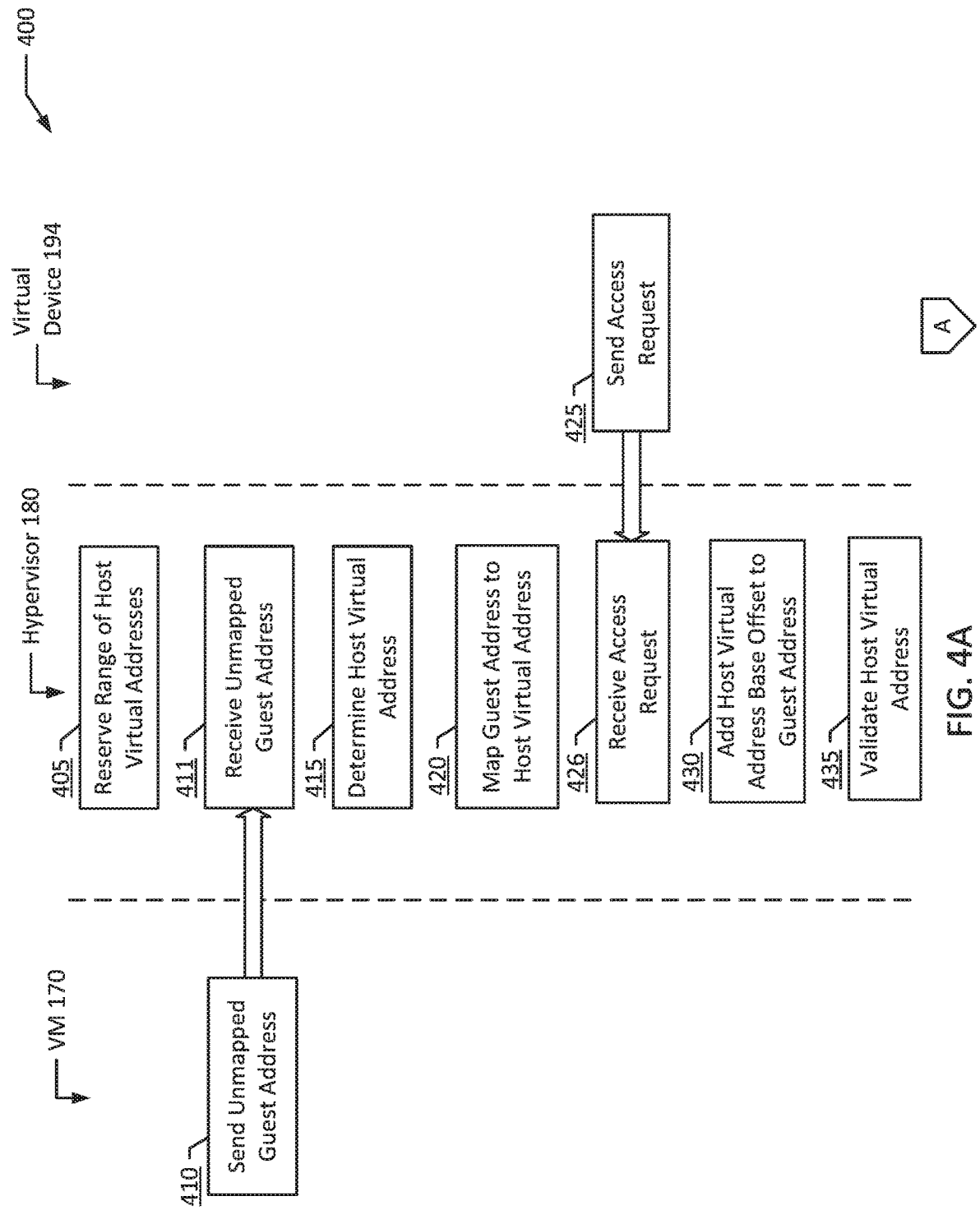
FIGS. 4A-B are flow diagrams illustrating translation bypass according to an example of the present disclosure.
Figure 4B:
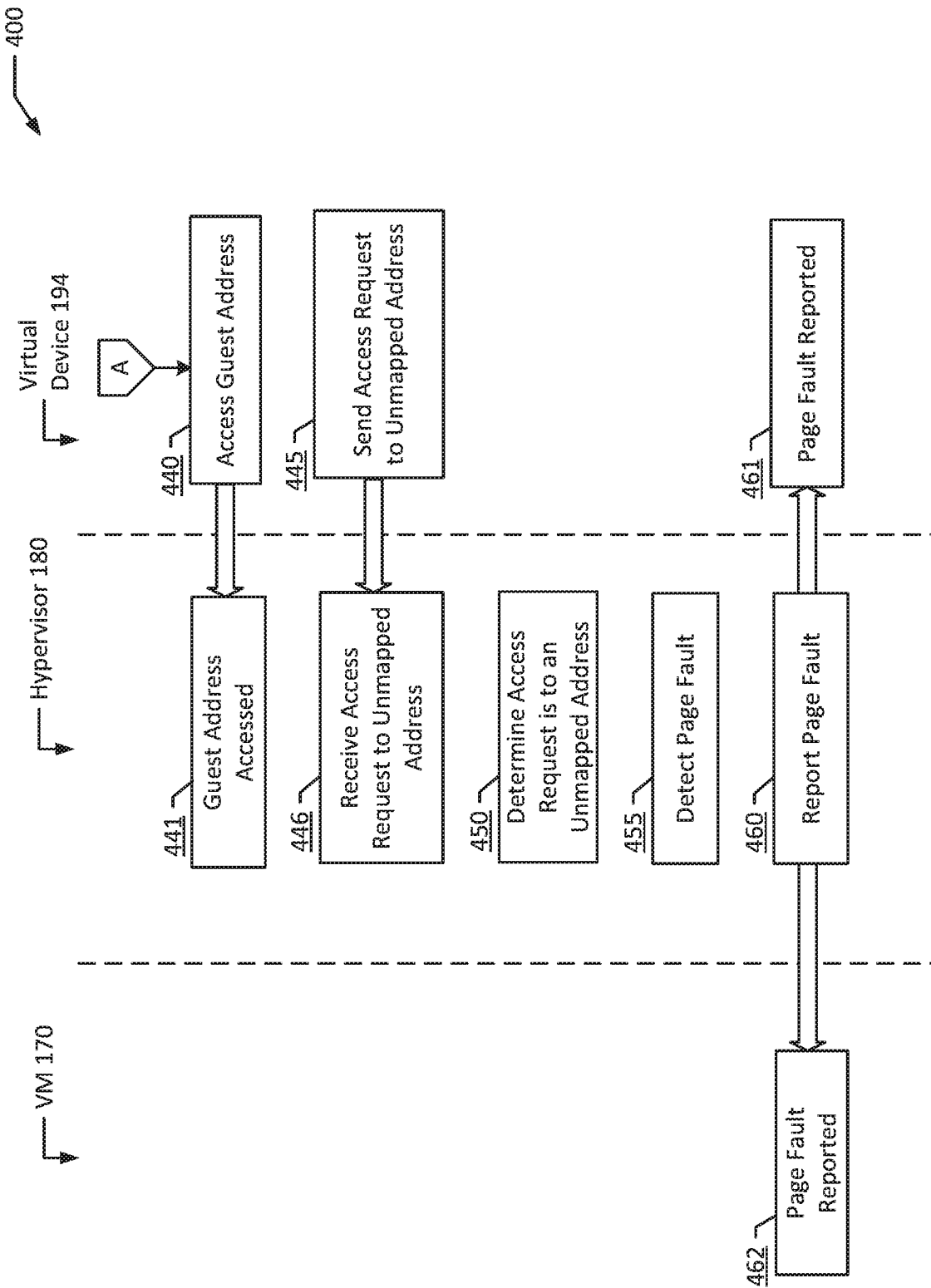

FIGS. 4A-B are flow diagrams illustrating translation bypass according to an example of the present disclosure. Although the example method 400 is described with reference to the flow diagram illustrated in FIGS. 4A-B, it will be appreciated that many other methods of performing the acts associated with the method may be used. For example, the order of some of the blocks may be changed, certain blocks may be combined with other blocks, and some of the blocks described may be optional. The method 400 may be performed by processing logic that may include hardware (circuitry, dedicated logic, etc.), software, or a combination of both. For example, the method may be performed by a hypervisor 180 interacting with guest virtual machine 170 and a virtual device 194.

In the illustrated example in FIG. 4A, the hypervisor 180 reserves a range of host virtual addresses 205 (block 405). For example, the range of host virtual addresses 205 is a reserved portion of host memory 184. In an example, initially, when the range of host virtual addresses 205 is reserved, all memory in the range of host virtual addresses 205 is unmapped. Likewise, in an example, the reserved range of host virtual addresses 205 is large enough to include all potential guest addresses that will be mapped. The guest virtual machine 170 sends an unmapped guest address to the hypervisor 180 (block 410). The hypervisor 180 receives the unmapped guest address (block 411). Additionally, for example, the hypervisor 180 detects that the guest address is unmapped.

The hypervisor 180 determines a host virtual address 220 (block 415). For example, determining the host virtual address 220 includes adding the received unmapped guest address to a host virtual address base offset. The determined host virtual address 220 is within the range of host virtual addresses 205, for example, since the reserved range of host virtual addresses 205 may be selected to be large enough to map all guest addresses for the guest virtual machine 170.

The hypervisor 180 maps the guest address to the host virtual address 220 (block 420). For example, the hypervisor 180 maps the guest physical address in guest memory 195 to the host virtual address 220. In an example, the hypervisor 180 maps the guest address to the host virtual address in a one-to-one relationship. In one example, the range of host virtual addresses 205 are configured to map guest physical addresses (e.g., the guest address is a guest physical address in guest memory 195). In this example, the hypervisor 180 is further configured to unmap the guest address from the host virtual address 220. In another example, the range of host virtual addresses 205 are configured to map guest bus addresses. In this example, the guest virtual machine 170 is configured to program a virtual input-output memory management unit 191 (e.g., the guest address is a guest bus address). In an example, the hypervisor 180 is further configured to retrieve, from the virtual input-output memory management unit 191, the guest bus address. Also, in an example, the hypervisor 180 is further configured to program a page table entry in guest page table 193. In an example, the hypervisor 180 is further configured to unmap the guest address from the host virtual address and invalidate the page table entry.

A virtual device 194 sends an access request to the hypervisor 180 (block 425). For example, the access request can be any of a request to transmit packets of information, a request to receive packets of information, etc. The hypervisor 180 receives the access request (block 426). The hypervisor 180 adds the host virtual address base offset to the guest address (block 430). For example, the hypervisor 180 adds the host virtual address base offset to the guest address that is related to the access request received from the virtual device 194. For example, the guest address is a guest address that the virtual device 194 wants to access to read packet data. The hypervisor 180 additionally validates the host virtual address (block 435). For example, validating the host virtual address includes ensuring that the determined host virtual address (e.g., the guest address with the added host virtual address base offset) is within the reserved range of host virtual addresses 205.

Continuing on to FIG. 4B, the virtual device 194 accesses the guest address (block 440). More particularly, the guest address is accessed, by the hypervisor 180, (block 441) at its stored location. For example, the guest address is accessed via the host virtual address 220, which is stored in the reserved range of host virtual addresses 205.

The virtual device 194 sends an access request to an unmapped address (block 445). For example, the virtual device 194 may attempt to access a guest address address (e.g., a guest physical address) that does not have a respective host virtual address 220 determined by the hypervisor 180 and stored in the reserved range of host virtual addresses 205 (e.g., an unmapped address). The hypervisor 180 receives the access request to the unmapped address (block 446). The hypervisor 180 determines that the access request is to an unmapped address (block 450). For example, the hypervisor 180 adds the requested guest address to the host virtual base address offset and determines that the determined address is outside of the reserved range of host virtual addresses 205. Responsive to receiving the request to access the unmapped guest address, the hypervisor 180 detects a page fault (block 455). In an example, the hypervisor 180 reports the page fault to a request originator (block 460). For example, the request originator may be the virtual device 194, such that the page fault is reported to the virtual device 194 (block 461). Likewise, for example, the request originator may be the guest virtual machine 170, such that the page fault is reported to the guest virtual machine 170 (block 462).

Figure 5:
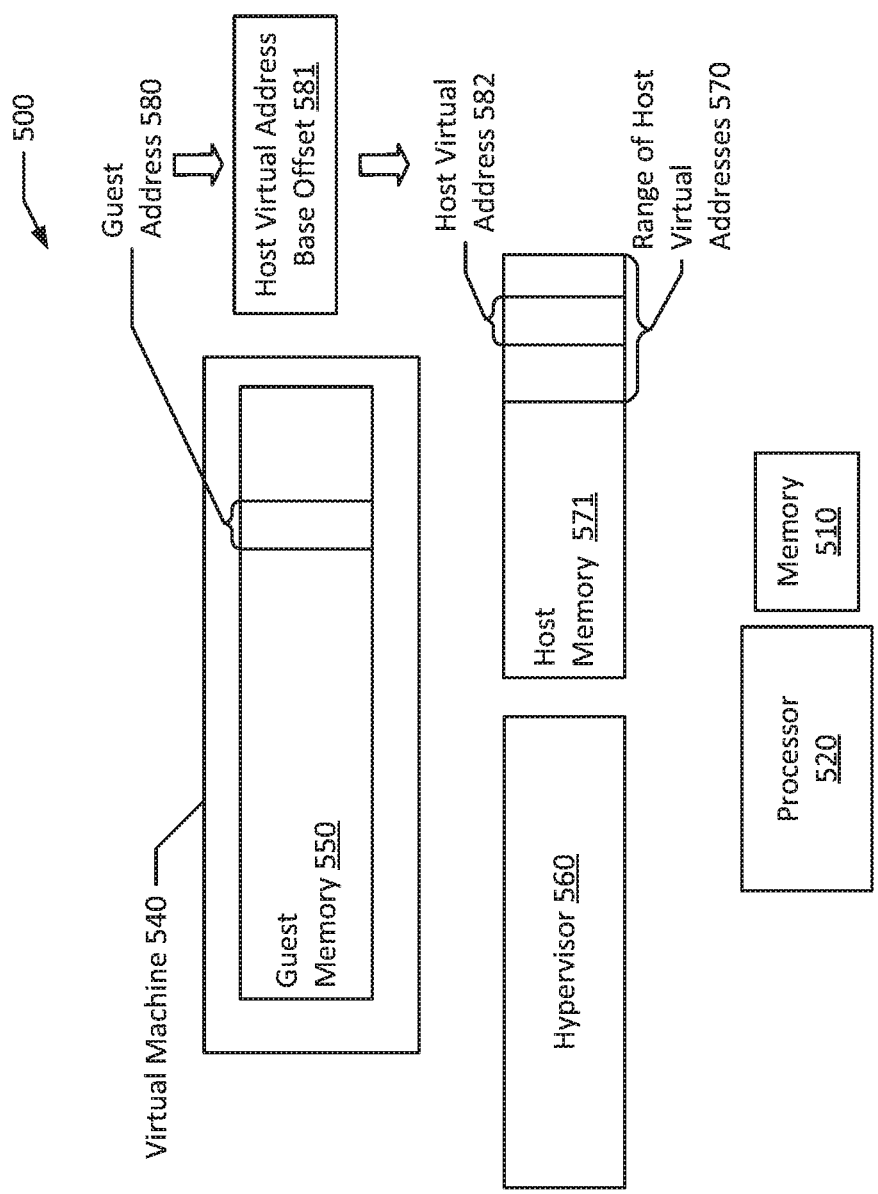
FIG. 5 is a block diagram of an example computer system according to an example of the present disclosure.

FIG. 5 is a block diagram of an example computer system 500 according to an example of the present disclosure. The computer system 500 may include a memory 510 and a processor 520 in communication with the memory 510. The computer system 500 may further include a virtual machine 540 configured to execute on the processor 520. The virtual machine 540 may include a guest memory 550. The computer system 500 may also include a hypervisor 560 configured to execute on the processor 520. The hypervisor 560 is configured to reserve a range of host virtual addresses 570 (e.g., a range of host virtual addresses in host memory 571). The hypervisor 560 may detect that a guest address 580 is unmapped and determine a host virtual address 582. Determining the host virtual address 582 may include adding the guest address 580 to a host virtual address base offset 581, where the host virtual address 582 is within the range of host virtual addresses 570 (e.g., the range of host virtual addresses in host memory 571). The hypervisor 560 is further configured to map the guest address 580 to the host virtual address 582 for hypervisor translation bypass. Accordingly, example computer system 500 may advantageously reduce overhead and increase efficiency of network function virtualization applications.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the examples described herein are apparent. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
reserving, by a hypervisor, a range of host virtual addresses in host memory;
detecting, by the hypervisor, that a guest address in guest memory is unmapped by verifying that the guest address in guest memory is not mapped to a host virtual address within the range of host virtual addresses in host memory;
determining, by the hypervisor, the host virtual address, wherein determining the host virtual address includes adding the guest address to a host virtual address base offset such that translation is bypassed, wherein the host virtual address is within the range of host virtual addresses, and wherein the translation includes translating the guest address to a guest physical address, which is translated to the host virtual address; and
mapping, by the hypervisor, the guest address to the host virtual address.

2. The method of claim 1, wherein the range of host virtual addresses are configured to map guest physical addresses.

3. The method of claim 2, further comprising unmapping the guest address from the host virtual address.

4. The method of claim 1, wherein the range of host virtual addresses are configured to map guest bus addresses.

5. The method of claim 4, further comprising programming, by a guest virtual machine, a virtual input-output memory management unit.

6. The method of claim 5, further comprising retrieving, by the hypervisor, from the virtual input-output memory management unit, a guest bus address and programming, by the hypervisor, a page table entry.

7. The method of claim 6, further comprising unmapping the guest address from the host virtual address and invalidating the page table entry.

8. The method of claim 1, further comprising receiving, by the hypervisor from a device, a request to access the guest address.

9. The method of claim 8, wherein responsive to receiving the request to access the guest address, the hypervisor adds the host virtual address base offset to the guest address.

10. The method of claim 9, wherein responsive to adding the host virtual address base offset to the guest address, the hypervisor validates that the host virtual address is within the range of host virtual addresses and the device accesses the guest address.

11. The method of claim 1, further comprising receiving, by the hypervisor from a device, a request to access an unmapped guest address.

12. The method of claim 11, further comprising, responsive to receiving the request to access the unmapped guest address, detecting, by the hypervisor, a page fault and reporting, by the hypervisor, the page fault to a request originator.

13. The method of claim 12, wherein the request originator is one of a guest virtual machine and a device.

14. The method of claim 1, wherein initially, when the range of host virtual addresses is reserved, all memory in the range of host virtual addresses is unmapped.

15. A system comprising:
a memory;
one or more processors, in communication with the memory;
a virtual machine, configured to execute on the one or more processors, the virtual machine including a guest memory; and a hypervisor, configured to execute on the one or more processors, wherein the hypervisor is configured to:
reserve a range of host virtual addresses in host memory;
detect that a guest address in guest memory is unmapped by verifying that the guest address in guest memory is not mapped to a host virtual address within the range of host virtual addresses in host memory;
determine the host virtual address, wherein determining the host virtual address includes adding the guest address to a host virtual address base offset such that translation is bypassed, wherein the host virtual address is within the range of host virtual addresses, and wherein the translation includes translating the guest address to a guest physical address, which is translated to the host virtual address; and
map the guest address to the host virtual address.

16. The system of claim 15, wherein the range of host virtual addresses are configured to map guest physical addresses.

17. The system of claim 16, wherein the hypervisor is further configured to unmap the guest address from the host virtual address.

18. The system of claim 15, wherein the range of host virtual addresses are configured to map guest bus addresses.

19. The system of claim 15, wherein the hypervisor is further configured to:
receive, from a device, a request to access the guest address, add the host virtual address base offset to the guest address, and validate that the host virtual address is within the range of host virtual addresses, such that the device accesses the guest address.

20. A computer-readable non-transitory storage medium comprising executable instructions that, when executed, are configured to cause a hypervisor to:
reserve a range of host virtual addresses in host memory;
detect that a guest address in guest memory is unmapped by verifying that the guest address in guest memory is not mapped to a host virtual address within the range of host virtual addresses in host memory;
determine the host virtual address, wherein determining the host virtual address includes adding the guest address to a host virtual address base offset such that translation bypassed, wherein the host virtual address is within the range of host virtual addresses, and wherein the translation includes translating the guest address to a guest physical address, which is translated to the host virtual address; and
map the guest address to the host virtual address.

* * * * *